UNITED STATES PATENT OFFICE.

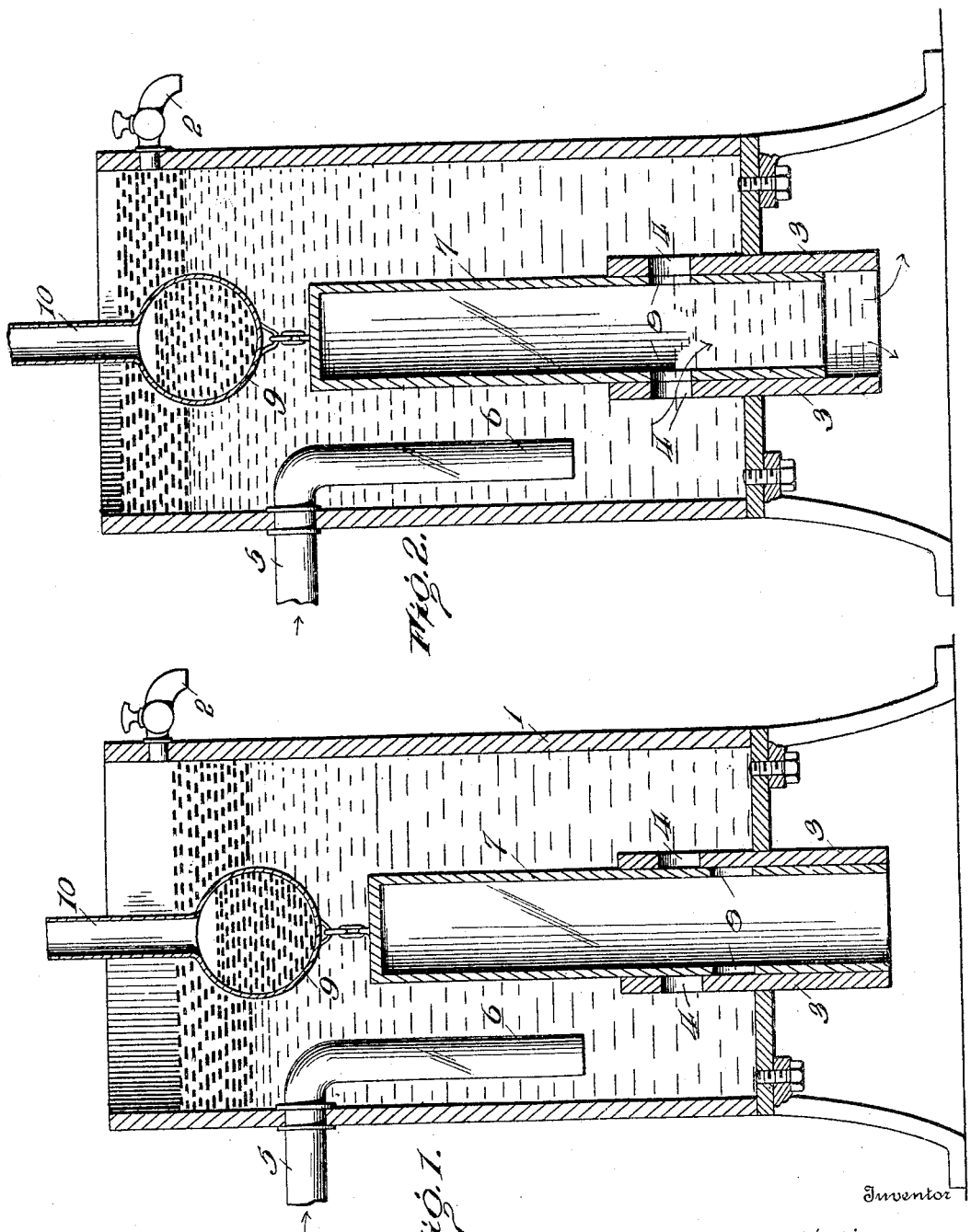

WIN D. WILLIAMS, OF PHILADELPHIA, PENNSYLVANIA.

OIL-SEPARATOR.

No. 804,908.     Specification of Letters Patent.     Patented Nov. 21, 1905.

Application filed January 6, 1905. Serial No. 239,904.

*To all whom it may concern:*

Be it known that I, WIN D. WILLIAMS, a citizen of the United States, residing at Philadelphia, in the county of Philadelphia and State of Pennsylvania, have invented certain new and useful Improvements in Oil-Separators, of which the following is a specification.

This invention provides a novel device for automatically separating oleaginous matter from liquid, such as oil from water, being particularly designed for collecting the oil contained in the water of condensation of steam-engines.

The invention comprises a receptacle having an oil-outlet and a water-discharge, the latter being in a lower plane than the former and controlled by means of a valve actuated by change of level of the water in the receptacle through the instrumentality of a nicely-balanced float.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a vertical central section of an oil-separator embodying the invention, showing the position of the float and valve when the discharge is closed. Fig. 2 is a view similar to Fig. 1, showing the position of the float and valve when the discharge is open.

Corresponding and like parts are referred to in the following description and indicated in both views of the drawings by the same reference characters.

The receptacle 1 for receiving the liquid to be separated may be of any capacity and shape and is provided near its upper end with an oil-outlet in the shape of a valve 2 and in its lower portion with a discharge for the water, said discharge consisting of a short pipe 3, having lateral openings 4 near its upper end. The inflow-pipe 5 for supplying the liquid to the separator connects with the source of supply, (not shown,) which may be the cylinder of an engine. The delivery portion of the inflow-pipe 5 extends vertically into the receptacle 1, as shown at 6, so as to direct the liquid into the lower portion of said receptacle, thereby preventing disturbance of the oil floating upon the liquid and separated therefrom. The pipe 3 is attached to the bottom of the receptacle 1 and extends above and below the same and is of uniform bore and smooth upon its interior, so as to make a close fit with the valve 7, which consists of a short length of tubing closed at its upper end and having openings 8 in its sides to register with the openings 4 in the pipe 3.

A hollow float 9 controls the movement of the valve 7 and is provided with a tubular stem 10, through which liquid of any kind, such as oil or water, or a solid in granular form, such as sand, shot, or the like, may be introduced for properly weighting the float according to the specific gravity of the liquid to be separated or the constituent parts thereof after separation has taken place. The float 9 is connected to the valve 7 in any manner and rises and falls with the change of level of the liquid in the receptacle.

The liquid containing the oil to be eliminated is admitted into the receptacle 1 through the inflow-pipe 5, and the oil by reason of its lesser specific gravity rises to the surface of the liquid and accumulates thereon, and the liquid, such as water, being of a greater specific gravity accumulates in the bottom of the receptacle, and when the line of demarcation between the oil and water reaches the predetermined level in the receptacle the float 9 is moved to a position so as to bring the openings 8 of the valve 7 in register with the openings 4 of the discharge-pipe 3, thereby permitting the water to automatically discharge. When the level of the water recedes, the float 9 correspondingly descends and permits the valve 7 to lower, with the result that the openings 8 are thrown out of register with the openings 4, thereby automatically closing the discharge. The water begins to accumulate in the receptacle, and as it rises the float ascends and lifts the valve and again opens the discharge, thereby preventing the level of the water exceeding the prearranged point. In the meantime the oil accumulates upon the surface of the water and is discharged through the oil-outlet 2. The provision of the valve 2 admits of the oil being drawn off at stated intervals or to discharge automatically when the valve is left open, as will be readily comprehended. The valve 7 being hollow provides an escape for the water and materially reduces its weight, so that a float 9 of comparatively small size may be successfully used to control its movements, thereby admitting of the separator occupying a comparatively small space. When the level of the water recedes, he float by reason of its arrangement directly above the valve 7 descends and settling upon said valve presses it downward until the openings 8 are thrown out of register with the openings 4, thereby cutting off the discharge. The liquid now begins to accumulate and the float rises with the level of the water, and the operation herein described is repeated.

Having thus described the invention, what is claimed as new is—

1. An oil-separator comprising a receptacle having an oil-outlet at its upper end, a vertical pipe in its bottom provided with a lateral opening, a tube telescoping with the said pipe and having a lateral opening to register with the lateral opening thereof, said tube constituting a valve and closed some distance above its lateral opening, and a float arranged within the receptacle directly above the tubular valve and connected thereto for positively controlling its movements in each direction and actuated by the change of level of the water in said receptacle.

2. An oil-separator comprising a receptacle, a valved outlet in the upper portion of said receptacle, a vertical pipe fitted to the bottom of the receptacle and extended above and below the same and having a lateral opening in its upper portion, a tube closed at its upper end and open at its lower end slidable within said pipe and having a lateral opening to register with the opening in the side of said pipe, a float arranged within the receptacle above the tube and attached directly to the upper end of said tube to positively control its movements in each direction and actuated by the change of level of the water in the receptacle, and an inflow-pipe extended into the receptacle to within a short distance of its bottom, substantially as set forth.

In testimony whereof I affix my signature in presence of two witnesses.

WIN D. WILLIAMS. [L. S.]

Witnesses:
 JOHN H. STEPHENS,
 A. B. LACEY.